# 3,505,341
2H[1]BENZOTHIOPYRANO[4,3,2-cd] INDAZOLE COMPOUNDS

Edward Faith Elsager and Donald Francis Worth, Ann Arbor, and John David Howells, Grosse Pointe Woods, Mich., assignors to Parke, Davis & Company, Detroit, Mich., a corporation of Michigan
No Drawing. Filed Dec. 22, 1967, Ser. No. 692,662
Int. Cl. C07d 99/06; A61k 27/00
U.S. Cl. 260—293.4                                      7 Claims

ABSTRACT OF THE DISCLOSURE 2-aminoalkyl - 2H - [1]benzothiopyrano[4,3,2-cd]indazoles (I)

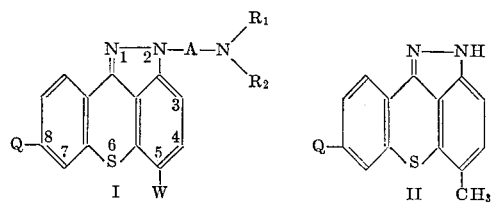

and salts are prepared by reacting: a haloalkylamine X—A—N($R_1$)$R_2$ with an indazole (II) or a dialkylaminoalkyl hydrazine $H_2N$—NH—A—N($R_1$)$R_2$ with a xanthene (III)

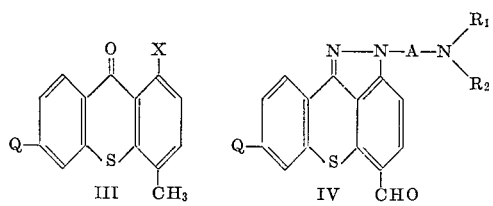

where A is alkylene; —N($R_1$)$R_2$ is dialkylamino or cyclic amino (e.g., piperidino); Q is H or halo; W is —$CH_3$, —$CH_2OH$ or —CHO; and X is halo. Products (I) where W is —$CH_2OH$ or —CHO are prepared by oxidative fermentation of the methyl isosteres; products where W is —$CH_2OH$ are also prepared by reduction of the aldehydes (IV). The products have antiparasitic and antibacterial properties and are pharmacological agents for topical, oral or parenteral use.

SUMMARY AND DETAILED DESCRIPTION

This invention relates to certain novel substituted 2H-[1]benzothiopyrano[4,3,2-cd]indazole compounds and to means for producing the same. More particularly, the invention relates to 2-aminoalkyl-2H-[1]benzothiopyrano-[4,3,2-cd]indazoles having in free base form the formula:

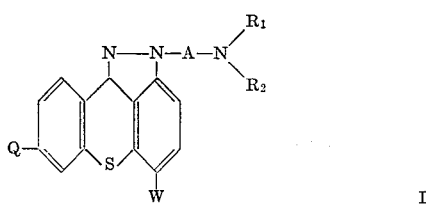

and to means for producing the same; where A is an alkylene radical containing 2 to 4 carbon atoms; Q is a hydrogen or a halogen aotm; $R_1$ and $R_2$ are the same or different and represent $C_1$-$C_4$ alkyl or together with the nitrogen atom [—N($R_1$)$R_2$] a lower alkylene radical containing 4 to 8 carbon atoms, 4 to 6 of which are joined in a ring with the nitrogen atom; and W is the aldehyde group —CHO or a methyl or hydroxymethyl group.

In accordance with one embodiment of the invention indazole compounds having in free base form the formula:

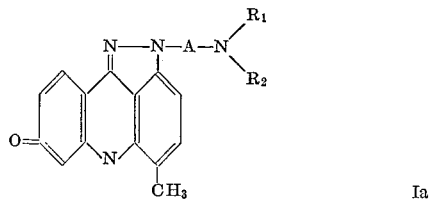

are prepared by reacting a haloalkylamine of formula X—A—N($R_1$)$R_2$ with an indazole of formula:

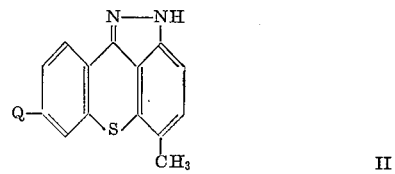

in the presence of base; and the product is isolated as the free base or optionally as the acid addition salt obtained by reacting the free base with an acid; where A, Q, $R_1$ and $R_2$ have the foregoing significance and X is a halogen atom. The conditions for the reaction may be varied widely and are not critical. In particular, the combining proportions of the reactants may be varied using, for example, equimolar amounts or an excess of either of the reactants. The use of an excess of the haloalkylamine reactant is preferred. As a base for the reaction any of the various alkali metal and alkaline earth metal hydrides and amides are suitable. Sodium hydride is a preferred base. The reaction is ordinarily carried out in an organic solvent. In general, one uses any unreactive aprotic solvent such as an aliphatic hydrocarbon, aromatic hydrocarbon, dimethylformamide, dimethylsulfoxide or saturated ether. Xylene is a preferred solvent for the reaction. The reaction is carried out at temperatures within the range of about 20–140° C. At these temperatures the reaction is complete within a short period ranging anywhere from about 4–20 hours.

In accordance with another embodiment of the reaction, indazole products having the foregoing Formula Ia are prepared by reacting a dialkylaminoalkylhydrazine $H_2N$—NH—A—N($R_1$)$R_2$ with a xanthene compound of formula:

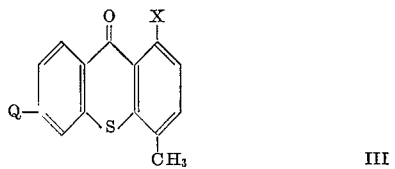

where A, Q, $R_1$, $R_2$ and X have the foregoing significance. The product is isolated as the free base or optionally as the acid addition salt obtained by reacting the free base with an acid. The reaction conditions are subject to considerable variation and are not critical. In particular the combining proportion of the reactants may be varied using equimolar amounts or an excess of either of the reactants. The use of an excess of the dialkylaminoalkylhydrazine is preferred. A solvent which is inert in the reaction is employed. Suitable solvents include pyridine, phenol, a lower alkanol such as methanol, or an excess of the dialkylaminoalkylhydrazine reactant. Pyridine is a preferred solvent for the reaction. The reaction is ordinarily carried out at elevated temperature in excess of about 75° C. Preferred temperatures are in the range from about 95–140° C. The reaction is ordinarily complete at these elevated temperatures within periods ranging from about 16–24 hours. For the isolation of the product from the reaction medium the same is made alkaline and then treated in any one of several ways: for example, the reaction medium may be subjected to steam distillation for removal of volatiles and the product extracted from the residue with a solvent such as ether. Alternatively, such a residue may be taken up in glacial acetic acid and the resulting solution diluted with water, filtered and the filtrate alkalinized and extracted with chloroform to provide the product in solution form. Still another method of isolation which is preferred involves extracting the reaction mixture with a solvent such as benzene and isolating the product from the extracts by chromatography.

According to still another embodiment of the invention, indazole products having the forgoing Formula I in which W represents an aldehyde group (—CHO) or a methanol group (—CH$_2$OH) are prepared by subjecting a product having Formula Ia to microbiological conversion. According to this method, the indazole starting material or substrate is incorporated with a microorganism in a suitable growth medium under fermentation conditions sufficient to cause the conversion of the indazole starting material to the corresponding indazole having Formula I in which W is an aldehyde group (—CHO) or methanol group (—CH$_2$OH). For this fermentation any of various microorganisms can be employed which, as determined by a routine screening procedure, have the ability to oxidize the methyl group in the way indicated. Specific examples of microorganisms applicable to oxidative fermentation are those from the orders Moniliales, Mucorales and Sphaeriales, as follows: *Aspergillus flavipes*, *Aspergillus niger* and *Aspergillus sclerotiorum* of the order Moniliales; *Mucor griseo-cyanus*, *Mucor parasiticus* *Syncephalis nodosa* and *Thamnidium elegans* of the order Mucorales; and *Chaetomium globosum*, *Chaetomium nigricolor* and *Didymella lycopersici* of the order Sphaeriales. Samples of the mentioned microorganisms are publicly available from recognized institutional culture collections such as the American Type Culture Collection. A preferred microorganism for the present invention is *Aspergillus sclerotiorum*, especially *A. sclerotiorum* available from the Imperial Mycological Institute as No. 56673.

Cultivation of the microorganism in accordance with the invention is carried out in an aqueous nutrient medium. The composition of the medium is determined by general considerations in the fermentation art which per se are well-known and includes an organic carbon source and a source of organic nitrogen. Optionally, the medium includes an inorganic nitrogen source and added growth factors, mineral salts and trace minerals. For purposes of illustration, starch, corn meal, sugars or glycerol represent suitable organic carbon sources. The organic nitrogen can be provided by any convenient source such as casein, soybean meal, peanut meal, cotton seed meal, wheat gluten, barley or oat tailings, lactalbumin, enzymatic digest of casein, tryptone, and meal peptone. A suitable inorganic nitrogen source is ammonium chloride or ammonium sulfate. Growth factor may be provided by distiller's solubles, yeast autolysate, yeast extract or molasses fermentation residues. Illustrative mineral salts are sodium chloride, potassium sulfate and magnesium sulfate. Copper, cobalt, manganese, iron and zinc are examples of trace minerals. For the control of foaming during the fermentation, an anti-foaming agent may be employed such as a polyglycol, silicone, lard oil, mineral oil, vegetable oil, or a higher alkanol anti-foaming agent.

The fermentation is conveniently carried out in successive stages: (1) preparation of slant cutures, (2) seed stage, (3) pre-conversion stage, and (4) conversion stage. The first three stages concern the preparation of the microorganism and fermentation medium in sizable quantity. At the conversion stage the indazole starting material is incorporated with the inoculated growth medium, and the fermentation is carried out for a period sufficient to result in the microbiological conversion of the substrate to the desired final product. The fermentation conditions such as pH, temperature, aeration, harvest, etc. are subject to considerable variations. The initial pH of the medium suitably is in the range from 5.5 to 7.5. The optimum pH is 6.4. If desired, a buffering agent such as calcium carbonate may be incorporated in the medium. The initial concentration of the indazole substrate in the fermentation medium can be varied, for example, from about 0.1 to 5 mg./ml. or higher, the optimum amount being about 0.5 mg./ml. The indazole can be incorporated in the fermentation medium in any suitable way, for example, as the free base, as the methanolic solution of the free base, or preferably as an aqueous solution of a salt of the free base. Temperatures ranging from about 20–40° C. may be used. The preferred temperature for the fermentation is 29–30° C. at which temperature the conversion is complete in about 40–44 hours. During the fermentation the mixture is agitated and aerated. Aeration is preferably maintained at the rate of about one-half volume per volume of fermentation medium per minute. Agitation is accomplished by conventional means, for example, by stirring with impellers at the rate of about 200 r.p.m. during the pre-conversion stage and about 250 r.p.m. during conversion. The rate of conversion can be conveniently followed by sampling and analyzing the samples during the course of the conversion. The samples obtained are extracted and the extracts analyzed by thin layer chromatography. For the isolation of the product the fermentation mixture is filtered and the resulting filtrate and the mycelium cake are separately extracted with a suitable organic solvent such as methylene chloride. The products are isolated in pure form from the extracts. In one procedure which is preferred the extracts are concentrated, redissolved in benzene and fractionated chromatographically on a column such as an alumina column. Preferred solvents or eluants for the recovery of the products from the column are benzene, ethyl acetate and benzene-ethyl acetate mixtures. Elution of the chromatographic column with benzene, for example, elution with separate portions of benzene containing successively increasing amounts of ethyl acetate, yields first the 5-carboxaldehyde indazole product and then the corresponding 5-methanol.

In yet another embodiment of the invention, indazole products having Formula I in which W is a methanol group (—CH$_2$OH) are prepared by subjecting a product having Formula IV to reduction employing alkali metal borohydride; where A, Q, R$_1$, R$_2$ and W have the foregoing significance. The reaction is carried out at ordinary temperature, preferably using sodium borohydride.

The free base compounds of the invention form acid additon salts upon reaction with organic and inorganic acids. Some examples of the acid addition salts of the invention are the inorganic acid salts such as the hydrochloride, hydrobromide, hydroiodide, sulfate and phosphate and organic acid salts such as the carbonate, succinate, benzoate, acetate, citrate, malate, maleate, p-toluenesulfonate, gluconate, benzenesulfonates and sulfamate, as well as salts with dibasic acids such as methylenebis-(hydroxynaphthoic acid). The acid addition salts are conveniently formed by mixing the free base with at least an equivalent amount of the acid in a solvent in which the salt is poorly soluble, particularly after chilling, thereby permitting recovery of the desired salt as a solid phase. The invention contemplates the acid salts broadly. In general, the choice of anion is not critical since the cation constitutes the active moiety. The selection and provision of salts for the purposes of the invention will be understood by those skilled in the art in accordance with general methods and ronsiderations which per se will be known to them. Those salts which are unsuited to particular uses, as for example uses where toxicity is a problem, are nevertheless useful as intermediates, being readily convertible to nontoxic acid salts by means which per se are known to those in the art. Whereas both the free base and salt forms of the products are useful for the purposes of the invention, the salts, especially with inorganic acids, are generally preferred in those cases where increased water solubility is desired.

The compounds of the invention are useful as pharmacological agents. The compounds in particular possess a high degree of antibacterial activity and hence are useful as antibacterial agents for topical, oral or parenteral administration. Typically, the products are cidal in vitro, for example, in doses as low as 20 gamma/ml. when tested by the standard procedure using such organisms as *S. pyogenes* and *E. coli*. The products, especially those having Formula I in which Q represents a chlorine atom or the group —CH$_2$OH, possess substantial schistosomicidal activity. Such products are useful as antischistosomal agents for administration orally or parenterally. Such compounds show good activity when administered in standard tests in the mouse by gavage or in the diet at doses, respectively of the order of 200 mg./kg. and 0.125%. The compounds of the invention also possess antitrichomonal activity and hence are useful as antitrichomonal agents for topical administration. For example, in standard tests the products typically are trichomonicidal in vitro at doeses of about 25 gamma/ml.

The present invention also contemplates the provision of pharmaceutical compositions in dosage unit form for use as therapeutic agents in which one or more of the indazole bases and/or salts is constituted as an active ingredient together with carriers or diluents. Solid carriers and diluents are particularly suitable and include sugars such as lactose and sucrose; cellulose derivatives such as sodium carboxymethyl cellulose, ethyl cellulose, methyl cellulose and cellulose acetate phthalate; gelatin (including hard and soft shell capsules); talc, corn starch, stearic acid and magnesium stearate. Liquid carriers and diluents suitable for use include vegetable oils such as peanut oil, cottenseed oil, sesame oil, olive oil, corn oil and oil of theobroma; polyethylene glycol; propylene glycol; glycerine, sorbitol; ethanol; and water. Suitable preservatives and flavoring agents can also be incorporated in such compositions. In the production of dosage forms such as tablets, an enteric coating or sugar coating can be applied to make the medicament more palatable. If administration by the parenteral route is desired, the composition can be formulated in ampoule form as a suspension or solution in a liquid diluent. Other therapeutic agents can also be incorporated with the compositions.

The starting materials for the preparation of the products of the invention either are known or can be prepared from known materials according to methods exemplified in the following description.

The invention is illustrated by the following examples.

EXAMPLE 1

5-methyl - 2H - [1]benzothiopyrano[4,3,2-cd]indazole (12.9 g., Ber., 49, 2487) is added to a suspension of sodium hydride (3.6 g.) in a 50% dispersion of oil and 100 ml. of xylene. After refluxing two hours the mixture is treated with a solution of 2-chlorotriethylamine (6.8 g.) in 100 ml. of xylene. The resulting mixture is refluxed for twenty hours. The reaction mixture is cooled, water is added and the organic layer is recovered and dried over anhydrous magnesium sulfate. The mixture is filtered and concentrated by evaporation to provide the desired product, 2-[2-(diethylamino)ethyl] - 5 - methyl-2H-[1]benzothiopyrano[4,3,2-cd]indazole M.P. 54–56° C. after crystallization from 2,2,4-trimethylpentane.

EXAMPLE 2

(a) A solution of 3-dimethylaminopropylhydrazine (59 g., J. Med. Chem., 7, 493), 100 ml. of pyridine and 130 g. of a 60:40 (weight) mixture containing 1-chloro-4-methyl and 4-chloro-1-methylthioxanthen-9-one (J. Am. Chem. Soc., 74, 4296) is refluxed for eighteen hours and cooled. Potassium hydroxide is added and the resulting mixture is subjected to steam distillation to remove volatile material. The residual product is filtered and the filter cake dissolved in glacial acetic acid. The resulting solution is treated with water, filtered and the filtrate alkalinized with sodium hydroxide and extracted with chloroform. The chloroform extracts are dried over anhydrous potassium carbonate and filtered and the filtrate concentrated to an oil. The residual oil is taken up in ether and the ether solution treated with anhydrous hydrogen chloride. The resulting product which separates is collected. This product is 2-[3-(dimethylamino)propyl]-5-methyl-2H - [1]benzothiopyrano[4,3,2-cd]indazole dihydrochloride ¾ hydrate; M.P. 200–204° C.

To convert the salt product to a different salt of the same free base the following procedure can be used: a solution of the dihydrochloride (3.96 g.) in 15 ml. of water is slowly added, with stirring, to a cooled solution of benzylpenicillin potassium (7.44 g.) in 15 ml. of water. The corresponding benzylpenicillin salt of the free base separates in the form of a yellow precipitate and is collected by filtration and dried under vacuum.

(b) A solution of 26 g. of 2-diethylaminoethylhydrazine (J. Med. Chem., supra), 29 g. of an 80:20 mixture containing 1,6-dichloro-4 - methyl and 4,6 - dichloro-1-methylthioxanthen-9-one (J. Am. Chem. Soc., supra), and 17 ml. of pyridine is reacted and is subjected to steam distillation according to the procedure described for paragraph (a) above. The residue resulting from the steam distillation is extracted from ether and the extracts dried over anhydrous potassium carbonate and filtered. Anhydrous hydrogen chloride is added and the resulting precipitate is collected by filtration, dissolved in water and the solution treated with sodium hydroxide. Ether extracts of the alkaline mixture are dried and treated with anhydrous hydrogen chloride. The resulting product, 8-chloro-2-[2 - (diethylamino)ethyl]-5-methyl-2H - [1]benzothiopyrano[4,3,2-cd]indazole monohydrochloride hemihydrate, is collected and recrystallized from 2-propanol; M.P. 199–202° C.

EXAMPLE 3

A solution of 2-(isopropylmethylamino)ethylhydrazine (10 g., J. Med. Chem., supra), 50 ml. of pyridine and 24 g. of an 80:20 mixture of 1,6-dichloro-4-methyl and 4,6-dichloro-1-methylthioxanthen-9-one (J. Am. Chem. Soc., supra) is refluxed for twenty-four hours and is then cooled to room temperature. After dilution with aqueous sodium hydroxide the reaction mixture is extracted with benzene and the extracts concentrated. The residue is taken up in benzene and the benzene solution is fractionated chromatographically by adsorption on an alumina column. The column is eluted successively first with benzene and then with benzene-ethylacetate mixture increasingly richer in ethyl acetate. The solution eluates are concentrated to provide as a residue the desired product, 8-chloro-2-[2 - (isopropylmethylamino)ethyl]-5-methyl-2H - [1]benzothiopyrano[4,3,2-cd]indazole; M.P. 87–88° C.

In the same manner using corresponding amounts of respective starting materials the following products may be obtained:

8-chloro-2-[3-(1-pyrrolidinyl)propyl]-5-methyl-2H-[1]-
    benzothiopyrano[4,3,2-cd]indazole; M.P. 86–87° C.
8-chloro-2-(3-piperidinopropyl)-5-methyl-2H-[1]benzo-
    thiopyrano[4,3,2-cd]indazole; M.P. 87–88° C.
8-chloro-2-(3-dimethylamino-2-methylpropyl)-5-methyl-
    2H-[1]benzothiopyrano[4,3,2-cd]indazole
8-bromo-2-[3-(butylmethylamino)propyl]-5-methyl-2H-
    [1]benzothiopyrano[4,3,2-cd]indazole Similarly, 8-chloro-2-[2-(2,6 dimethyl piperidino)-ethyl]-5-methyl-2H - [1]benzothiopyrano[4,3,2-cd]indazole and the corresponding 2-[3-hexamethyleneimino)-propyl] substituted indazole can be prepared starting with the appropriate substituted alkyl hydrazine starting materials which starting materials can be prepared by the following illustrative procedure:

For the required dimethylpiperidino ethylhydrazine, 2-(2,6-dimethylpiperidino)ethyl chloride (87.8 g.) is added to a solution of 100 g. of 85% technical hydrazine and 100 ml. of water at room temperature while maintaining a temperature less than 30° C. When addition is complete, 35 g. of anhydrous potassium carbonate are added and the resulting mixture is heated at reflux temperature for seven hours. Solid sodium hydroxide (187 g.) is added in portions, the resulting alkaline mixture is extracted with two 250-ml. portions of ether and the ether extracts dried over solid potassium hydroxide. The extracts are concentrated and the residue subjected to vacuum distillation to yield the desired 2-(2,6-dimethylpiperidino)-ethylhydrazine.

EXAMPLE 4—MICROBIOLOGICAL CONVERSION

Preparation of slant cultures (a) A suspension of a lyophilized culture of *Aspergillus sclerotiorum* (from the Commonwealth Mycological Institute as CMI 56673, also known as IMI 56673) in sterile distilled water is inoculated on slants of agar medium containing pancreatic digest of casein, papaic digest of soya meal, and sodium chloride. After incubation at 28° C. for at least one week, 10 ml. of sterile aqueous 0.1% sodium heptadecyl sulfate solution is added to each of four selected slants so that the spores and vegetative growth are loosened. The resulting mixtures are added to the growth medium described below.

Preparation of seed (seed stage)

The mixtures obtained from the slant cultures are added to a 30-liter fermentation vessel containing 12 liters of a sterile growth medium having the following composition:

| Ingredient: | Percent |
|---|---|
| Glucose monohydrate | 2.0 |
| Soybean meal (solvent extracted, 44% protein) | 2.0 |
| Brewers yeast (U.S.P., Yeast Products Co.) | 0.5 |
| Sodium chloride | 0.5 |
| Dipotassium hydrogen phosphate (anhydrous) | 0.5 |

Adjusted to pH 6.4 with 10 N sodium hydroxide and sterilized by heating at 121° C.
Q.s. with tap water to 100

The resulting growth medium mixture is agitated at 200 r.p.m. and maintained at a temperature of 30° C. for thirty-six hours to provide the first-stage seed.

Pre-conversion stage

First-stage seed in the amount of 800 ml. is added to 16 liters of growth medium having the composition described above and the resulting mixture is agitated in a 30-liter fermenter at 30° C. for thirty-two hours.

Conversion stage

A solution of 2-[2-(diethylamino)ethyl]-5-methyl-2H-[1]benzothiopyrano[4,3,2-cd]indazole (8 g.) in 200 ml. of methanol is then added and the resulting mixture agitated at 250 r.p.m. and 30° C. for forty-seven hours. The resulting fermentation medium is filtered and the filtrate and filter cake are separately extracted with methylene chloride. The extracts are combined and concentrated to a residue which is taken up in benzene and fractionated by chromatography on a column. A column measuring 5 x 125 cm. is used, filled with 1 kg. of powdered alumina (chromatograph grade, F-20, Alcoa). Solvent fractions (ca. one liter each) are put through the column having the following proportions ranging from pure benzene through benzene-ethyl acetate mixtures to pure ethyl acetate:

| Fractions | Percent Benzene | Ethyl acetate |
|---|---|---|
| 1-11 | 100 | 0 |
| 12-14 | 98 | 2 |
| 15-20 | 95 | 5 |
| 21-23 | 90 | 10 |
| 24-63 | 80 | 20 |
| 64-74 | 60 | 40 |
| 75-94 | 20 | 80 |
| 95-128 | 0 | 100 |

The first product eluted is 2-[2-(diethylamino)ethyl]-2H-[1]-benzothiopyrano[4,3,2-cd]indazole-5-carboxaldehyde; in one run substantially all of this product was in fractions 31-48. The fractions containing the product are concentrated for isolation of the product; M.P. 83-86° C. after recrystallization from 2,2,4-trimethylpentane. The second product eluted (substantially all appearing in fractions 82-128) is 2-[2-(diethylamino)ethyl]-2H-[1]benzothiopyrano[4,3,2-cd]indazole-5-methanol; M.P. 85-86° C. after concentration and recrystallization from cyclohexane. For purposes of workup in the foregoing procedure, the presence of the desired products in a given sample is conveniently determined by thin layer chromatography.

(b) A solution of the 5-carboxaldehyde product of procedure (a) in the amount of 1 g. of 175 of methanol is treated with 0.2 g. of sodium borohydride. After stirring five hours at room temperature, the mixture is diluted with 200 ml. of ice water. The product of the reduction, 2-[2 - (diethylamino)ethyl]-2H-[1]benzothiopyrano[4,3,2-cd]indazole-5-methanol, separates as a precipitate and is collected by filtration. As an alternative procedure the methylene chloride extracts of the fermentation mixture of paragraph (a) (containing both the 5-carboxaldehyde and the 5-methanol) are concentrated and the residue dissolved in 175 ml. of methanol. The solution is treated with sodium borohydride in the manner just described to obtain exclusively the 5-methanol product.

(c) Proceeding by the same method described above for paragraph (a) but starting instead with an aqueous solution of 8-chloro-2-[2-(diethylamino)ethyl]-5-methyl-2H - [1]benzothiopyrano[4,3,2-cd]indazole monohydrochloride hemihydrate, the two products obtained are 8-chloro-2-[2-(diethylamino)ethyl] - 2H - [1]benzothiopyrano[4,3,2-cd]indazole-5-carboxaldehyde (M.P. 131–132° C. from iso-octane:ether) and 8-chloro-2-[2-(diethylamino)ethyl]-2H-[1]benzothiopyrano[4,3,2 - cd]indazole-5-methanol; M.P. 157–158° C. Similarly, by this method starting instead with a methanolic solution of 8-chloro-2-[2-(isopropylmethylamino)ethyl]- or 8-chloro - 2 - (3-piperidinopropyl)-5 - methyl-2H-[1]benzothiopyrano[4,3,2-cd]indazole, one obtains the corresponding 5-carboxaldehyde and 5-methanol products respectively.

We claim:
1. A member selected from the group consisting of a free base having the formula:

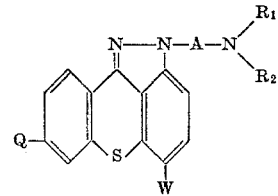

I and its acid addition salts; where A is an alkylene radical containing 2 to 4 carbon atoms; Q is a hydrogen or a halogen atom; $R_1$ and $R_2$ are the same or different and represent $C_1$–$C_4$ alkyl or together a lower alkylene radical containing 4 to 8 carbon atoms, 4 to 6 of which are joined in a ring with the nitrogen atom; and W is the aldehyde group —CHO or a methyl or hydroxymethyl group.

2. A member selected from the group consisting of a compound according to claim 1 where A is ethylene, Q is chloro, $R_1$ and $R_2$ are each ethyl and W is methyl, which compound is 8-chloro-2-[2-(diethylamino)ethyl]-5-methyl-2H-[1]benzothiopyrano[4,3,2-cd]indazole, and its acid addition salts.

3. A member selected from the group consisting of a compound according to claim 1 where A is ethylene, Q is chloro, $R_1$ and $R_2$ are each ethyl and W is hydroxymethyl, which compound is 8-chloro-2-[2-(diethylamino)-ethyl] - 2H - [1]benzothiopyrano[4,3,2 - cd]indazole-5-methanol, and its acid addition salts.

4. A member selected from the group consisting of a compound according to claim 1 where A is ethylene, Q is chloro, $R_1$ and $R_2$ are each ethyl and W is —CHO, which compound is 8-chloro-2-[2-(diethylamino)ethyl]-2H-[1]benzothiopyrano[4,3,2-cd]indazole - 5 - carboxaldehyde, and its acid addition salts.

5. A member selected from the group consisting of a compound according to claim 1 where A is ethylene, Q is hydrogen, $R_1$ and $R_2$ are each ethyl and W is hydroxymethyl, which compound is 2-[2-(diethylamino)-ethyl] - 2H - [1]benzothiopyrano[4,3,2 - cd]indazole-5-methanol, and its acid additional salts.

6. A member selected from the group consisting of a compound according to claim 1 where A is ethylene, Q is hydrogen, $R_1$ and $R_2$ are each ethyl and W is —CHO, which compound is 2-[2-(diethylamino)ethyl]-2H-[1]-benzothiopyrano[4,3,2-cd]indazole-5-carboxaldehyde, and its acid addition salts.

7. A member selected from the group consisting of a compound according to claim 1 where A is propylene, Q is chloro, —N($R_1$)$R_2$ is piperidino and W is methyl, which compound is 8 - chloro-2-(3-piperidinopropyl)-5-methyl-2H-[1]benzothiopyrano[4,3,2-cd]indazole, and its acid addition salts.

References Cited

UNITED STATES PATENTS 3,235,564   2/1966   Wagner.

HENRY R. JILES, Primary Examiner

S. D. WINTERS, Assistant Examiner

U.S. Cl. X.R.

195—51, 81; 260—310, 328; 424—267, 273